(12) United States Patent
Lacouture et al.

(10) Patent No.: US 9,058,041 B2
(45) Date of Patent: Jun. 16, 2015

(54) HYBRID DOSING UNIT

(71) Applicant: Faurecia Systemes D'Echappement, Nanterre (FR)

(72) Inventors: Francois Lacouture, Besancon (FR); Benjamin Oblinger, Montbeliard (FR)

(73) Assignee: Faurecia Systemes D'Echappement, Nanterre (FR)

( * ) Notice: Subject to any disclaimer, the term of this patent is extended or adjusted under 35 U.S.C. 154(b) by 0 days.

(21) Appl. No.: 13/959,959

(22) Filed: Aug. 6, 2013

(65) Prior Publication Data

US 2014/0041729 A1  Feb. 13, 2014

(30) Foreign Application Priority Data

Aug. 10, 2012 (FR) .................................... 12 57759

(51) Int. Cl.
*F16K 31/02* (2006.01)
*G05D 7/06* (2006.01)
*F01N 3/20* (2006.01)

(52) U.S. Cl.
CPC .............. *G05D 7/0629* (2013.01); *F01N 3/208* (2013.01); *F01N 2610/14* (2013.01); *Y02T 10/24* (2013.01)

(58) Field of Classification Search
CPC .. G05D 7/0635; G05D 7/0647; F01N 3/0814; F01N 2610/14; F16K 17/00
USPC .......... 137/487.5, 2; 60/286; 73/1.35, 861.42, 73/861.49, 861.52; 222/20, 21
See application file for complete search history.

(56) References Cited

U.S. PATENT DOCUMENTS

| | | | | |
|---|---|---|---|---|
| 6,131,572 A | * | 10/2000 | Heinonen | 128/205.24 |
| 6,782,906 B2 | * | 8/2004 | Chang | 137/10 |
| 6,913,031 B2 | * | 7/2005 | Nawata et al. | 137/12 |
| 7,100,800 B2 | * | 9/2006 | Yakasovic Saavedra et al. | 222/3 |
| 7,412,986 B2 | * | 8/2008 | Tison et al. | 137/12 |
| 7,461,549 B1 | * | 12/2008 | Ding et al. | 73/239 |
| 7,615,120 B2 | * | 11/2009 | Shajii et al. | 118/666 |
| 7,628,860 B2 | * | 12/2009 | Shajii et al. | 118/666 |

(Continued)

FOREIGN PATENT DOCUMENTS

EP 2366448 A1 9/2011
JP H0917734 A 1/1997

OTHER PUBLICATIONS

Search Report from corresponding FR application.

*Primary Examiner* — John K Fristoe, Jr.
*Assistant Examiner* — Minh Le
(74) *Attorney, Agent, or Firm* — Carlson, Gaskey & Olds, PC

(57) ABSTRACT

An assembly provides a proportioned gas flow and includes
  a device that provides a pressurized flow of said gas,
  a release unit that releases the proportioned gas flow, and
  a chamber having an inlet fluidically connected to the device and an outlet fluidically connected to the release unit. The assembly further includes
  an admission valve inserted between the inlet of the chamber and the device,
  a metering valve inserted between the outlet of the chamber and the release unit, and
  a computer programmed to control the admission valve and the metering valve to provide a proportioned gas flow to the release unit.
The assembly further comprises a calibrated orifice inserted between the outlet of the chamber and the release unit.

18 Claims, 5 Drawing Sheets

(56) References Cited

U.S. PATENT DOCUMENTS

| | | | | |
|---|---|---|---|---|
| 7,628,861 | B2 * | 12/2009 | Clark | 118/666 |
| 7,829,353 | B2 * | 11/2010 | Shajii et al. | 438/5 |
| 8,776,821 | B2 * | 7/2014 | Woelk et al. | 137/89 |
| 2003/0183279 | A1 * | 10/2003 | Chang | 137/487.5 |
| 2004/0244837 | A1 * | 12/2004 | Nawata et al. | 137/487.5 |
| 2009/0183548 | A1 | 7/2009 | Monkowski | |
| 2010/0319325 | A1 * | 12/2010 | Reusing et al. | 60/286 |
| 2013/0098003 | A1 * | 4/2013 | Pietraszek | 60/286 |

* cited by examiner

HYBRID DOSING UNIT

CROSS-REFERENCE TO RELATED APPLICATION

This application claims priority to FR 1257759, filed Aug. 10, 2012.

TECHNICAL FIELD

The invention generally relates to gas, notably ammonia, metering devices.

More specifically, the invention according to a first aspect relates to an assembly that provides a proportioned gas flow, of the type comprising: a device providing a flow of said pressurized gas; a unit releasing the proportioned gas flow; a chamber having an inlet fluidically connected to the device providing gas and an outlet fluidically connected to the release unit; an admission valve inserted between the inlet of the chamber and the device providing gas; a metering valve, inserted between the outlet of the chamber and the release unit; and a computer programmed to control the admission valve and the metering valve to provide the proportioned gas flow to the release unit.

BACKGROUND

Such an assembly is, for example, known from WO 2011/113454.

With such an assembly it is possible to carry out so-called "volumetric metering," in which by knowing the thermodynamic conditions prevailing in the chamber before and after injection of gas (pressure, temperature), it is possible to know the mass delivered at the release unit.

In the volumetric metering method, the admission valve is first opened, while maintaining the metering valve closed to fill the chamber with the gas from the supply device.

Once the chamber is filled, the admission valve is closed and the metering valve is opened. The gas escapes from the chamber and flows as far as the release unit.

Such an assembly allows metering of the gas flow with high accuracy for low flow rates. Indeed, the calculation of the injected mass is independent of the corresponding opening durations of the valves and of the transient phases.

On the other hand, such an assembly is not well adapted for providing a high gas flow rate. This flow rate is actually limited by the opening and closing duration of the valves, and by the duration required for filling and emptying the chamber.

In this context, the invention aims at proposing a supply assembly which is well adapted for a more extended gas flow rate range.

SUMMARY

For this purpose, a supply assembly of the aforementioned type further comprises a calibrated orifice that is inserted between the outlet of the chamber and the release unit.

Thus, it is possible, when a high gas flow rate is required, to carry out the metering of the gas flow in a sonic way.

In order to carry out sonic metering, the computer opens both the admission valve and the metering valve. If the upstream pressure level is sufficient, the instantaneous gas flow rate through the calibrated orifice only depends on the pressure and on the temperature upstream from the calibrated orifice. The metering of the gas flow is carried out by controlling the opening duration of the metering valve.

Such a control strategy is well adapted to obtaining a high gas flow rate. Indeed, this flow rate is not limited by the time required for filling and emptying the chamber sequentially.

Thus, the computer may be programmed in order to control the valves so that the gas flow is metered volumetrically for low flow rates and in a sonic way for high flow rates.

The assembly may therefore be used over a large flow rate range, without increasing the bulkiness of this assembly in an excessive way.

Indeed, in the absence of a calibrated orifice, only volumetric metering may be contemplated. In order to increase the maximum mass flow rate of the gas flow, it is necessary to increase the volume of the chamber. This entails an increase in the bulkiness of the gas supply assembly.

The supply assembly of the invention gives the possibility of having excellent metering accuracy for the whole flow rate range of the relevant gas. Volumetric metering is particularly accurate for low flow rates. On the contrary, sonic metering is inaccurate for low flow rates, since the metering valve is open over a too short duration for stable sonic flow operating conditions through the calibrated orifice to be established. The gas flow conditions only consist of transient phases which do not satisfy the equations under sonic operating conditions. The calculation of the injected mass is therefore not very accurate in this case.

Moreover, by using sonic metering for high flow rates, it is possible to reduce the actuation frequency of the valves. Indeed, if the gas flow was only metered volumetric ally at a high flow rate, the activation frequency of the valves would be high. For example, for a pressure of 3 bars provided by the supply device at 20° C., for a chamber having an internal volume of 3 $cm^3$, it is possible to deliver 4.2 milligrams per injection. In order to achieve a flow rate of 20 milligrams of ammonia per second, the actuation frequency of the valve should be of about 4.8 hertz. On the contrary, if sonic metering is used, with a neck of a diameter of 0.61 millimeters, an injection frequency of 1 hertz is sufficient.

Further, when the supply assembly is at a standstill, both valves are closed, so that a dual seal level is generated. This strongly reduces the fault rate.

The gas is typically ammonia. Alternatively, the gas is air or oxygen or nitrogen or any other type of gas.

The unit for releasing the proportioned gas flow is, for example, intended to release the gas in a conduit of an exhaust line. Notably, it is intended to release the gas upstream from an SCR (Selective Catalytic Reduction) catalyst. The ammonia in this case allows reduction of mono-nitrogen oxides NOx into $N_2$.

The release unit is of any suitable type: a simple tube opening into a conduit, an anti-return valve, or other device.

The device that provides a pressurized gas flow is of any suitable type depending on the gas. When the gas is ammonia, the supply device is, for example, a storage of ammonia in pressurized gas form. Alternatively, the ammonia is stored in one or several tanks containing metal salts provided for absorbing ammonia. Thus, the ammonia is stored in this case in solid form. Such a supply device generally includes a heating unit actuated by the computer. The metal salts when they are heated desorb ammonia.

Such devices for providing ammonia are described in EP 2 316 558, DE 10 2001 022 858, FR 1255277 and FR 1255281, or FR 1255273.

According to another alternative, the ammonia is, for example, stored in the form of ammonium carbamate. The supply device then includes a heating reactor containing an amount of ammonium carbamate. The computer triggers the heating of the ammonium carbamate, when required, which causes decomposition of the latter and the production of an ammonia gas flow.

The chamber delimits an internal volume typically comprised between 1 and 10 cm$^3$, for example comprised between 2 and 8 cm$^3$ and advantageously having the value of 3 cm$^3$. The inlet and the outlet communicate with the internal volume.

The admission valve and the metering valve are typically solenoid valves. Alternatively, these valves may be pneumatic or other valves.

These are typically ON/OFF valves, i.e. valves only having an open position and a closed position.

Alternatively, the metering valve and the admission valve are adjusting valves which may occupy an open position, a closed position, and a plurality of partially open positions.

The computer is either a computer dedicated to the supply assembly or a portion of an existing computer, for example, the vehicle engine computer.

The calibrated orifice is implanted in a conduit connecting the metering valve to the release unit. Alternatively, the orifice is implanted between the outlet of the chamber and the metering valve, or further a passage section of the metering valve may itself form the calibrated orifice. Its passage section is selective so that, considering the pressure and the temperature of the gas flow provided by the supply device, the flow through the orifice is sonic. For example, for a pressure range comprised between 2.5 and 5 bars and a temperature range comprised between −30° C. and 85° C., a calibrated orifice is selected with a diameter comprised between 0.2 and 2 millimeters, for example between 0.3 and 1 millimeter, preferably between 0.4 and 0.7 millimeters.

As indicated above, the flow rate range which may be obtained with the supply assembly of the invention is very wide. For example, for a chamber with an internal volume of 3 cm$^3$, a pressure provided by the supply device of 3 bars, at 20° C., with a calibrated orifice of a diameter of 0.61 millimeters, the flow rate range is comprised between 2 and 170 milligrams per second.

The supply assembly may also have one or several of the features below, considered individually or according all the technically possible combinations.

Preferably, the supply assembly comprises a unit that acquires a current pressure in the chamber and informs the computer. This pressure is used for calculating the flow rate of the proportioned gas flow. Typically, this acquisition unit is a pressure sensor that measures the current pressure in the chamber. Alternatively, the acquisition unit is an estimated model implanted in the computer. This model evaluates the pressure in the chamber from the knowledge of the behavior of the elements upstream and downstream from the unit, optionally with pressure sensors located upstream and downstream from the unit.

Alternatively, the pressure sensor is replaced with a differential pressure sensor measuring the pressure difference between the chamber and the release unit.

Advantageously, the assembly comprises a unit that acquires a current temperature in the chamber and informs the computer. This temperature is used for calculating the flow rate of the proportioned gas flow. Typically, the acquisition unit is a temperature sensor, measuring the temperature in the chamber. Alternatively, the temperature sensor is replaced with the estimated model, implanted in the computer. This estimated model calculates the current temperature of the chamber from the ambient temperature, for example measured at the side-view mirror on the driver side of the automobile vehicle and notably taking into account the dynamics of the vehicle.

Typically, the computer is programmed to control the admission valve and the metering valve according to a set gas flow rate value:

for a set flow rate value greater than a first predetermined limit, the computer is programmed for applying at least one sonic metering step wherein the admission valve and the metering valve are open simultaneously for a determined duration, at a determined frequency;

for a set flow rate value of less than a second pre-determined limit, the computer is programmed for applying at a determined frequency, at least:

a step for filling the chamber wherein the admission valve is open and the metering valve is closed;

a volumetric metering step, wherein the admission valve is closed and the metering valve is open for a determined duration.

Preferably, the chamber comprises a taring device suitable for taring an internal volume of the chamber. The taring device, for example, includes a mobile wall, delimiting the internal volume of the chamber. This device also includes a unit provided to displace the mobile wall relatively to the other walls of the chamber to vary the internal volume. This unit is, for example, an adjustment screw, a piston, or any other suitable unit. This allows the internal volume to be set to the desired value. This operation is typically carried out during the manufacturing of the supply assembly. Once the supply assembly is assembled, this assembly is tested under determined conditions: pressure and temperature of the pressurized gas flow, at the outlet of the supply device, opening and closing cycle of the admission and metering valves. These conditions are provided for operating the supply assembly according to a volumetric metering mode. The flow rate of the proportioned gas flow obtained at the release unit is then measured and this flow rate is compared with the theoretically expected value. The internal volume is then adapted via the taring device, until the theoretical flow rate is obtained.

Advantageously, the assembly comprises an additional chamber, the chamber being adapted to be selectively mounted alone in the supply assembly, or to be mounted together with the additional chamber in the supply assembly, with the chamber and the additional chamber then having respective internal volumes fluidically communicating with each other.

Thus, it is possible to vary the gas storage capability according to needs. This notably allows adjustment of the flow rate range which may be obtained by volumetric metering. The larger the volume of the chamber, the wider is the flow rate range which may be obtained by volumetric metering. It is thus possible to equip vehicles having more powerful engine types with a supply assembly having both the chamber and the additional chamber, and vehicles having less powerful engine types with a supply assembly only having the chamber without any additional chamber. The supply assembly is thus adapted to the engine type without having to modify the valves or the sensors.

The chamber may, for example, include a removable wall. This wall may be disassembled and replaced with the additional chamber. The chamber and the additional chamber are either assembled irreversibly by a weld (laser, vibration, rotation) or else reversibly (fast connector, screwing, etc.). The passage section provided for the gas between the chamber and the additional chamber is selected so as to provide fluidic resistance less than or equal to that of the addition valve. This guarantees pressure homogeneity between the internal volume of the chamber and the internal volume of the additional chamber.

According to a second aspect, the invention is directed to a method for controlling a supply assembly having the features above, the method including the following steps:

acquiring a set gas flow rate value;

comparing the set gas flow rate value with first and second predetermined limits;

if the set flow rate value is greater than the first predetermined limit, applying a sonic metering method comprising at least one sonic metering step wherein the admission valve and the metering valve are open simultaneously for a determined duration, at a determined frequency; and if the set flow rate value is less than a second predetermined limit, applying a volumetric metering method, comprising at least the following steps, performed at a determined frequency:

a step for filling the chamber wherein the admission valve is open and the metering valve is closed; and a volumetric metering step wherein the admission valve is closed and the metering valve is open for a determined duration.

In the case when the supply assembly is intended for providing ammonia to a vehicle exhaust line, the said gas flow rate value mainly depends on the operating conditions of the heat engine of the vehicle. It is typically calculated by the computer, according to parameters relating to the operation of the heat engine. Such a calculation is standard, and will not be detailed here.

Advantageously, the sonic meeting method successively comprises:

an opening step wherein the admission valve is open and the metering valve is closed;

the sonic metering step;

a closing step, wherein the admission valve is open and the metering valve is closed; and a waiting step, wherein the admission valve is closed and the metering valve is closed.

Preferably, the volumetric metering method successively comprises:

the filling step, an intermediate step wherein the admission valve is closed and the metering valve is closed;

the volumetric metering step; and a waiting step, wherein the admission valve is closed and the metering valve is closed.

Typically, in the sonic metering method, the gas flow is metered by selecting the duration of the sonic metering step and/or by selecting the repetition frequency of the sonic metering step.

Advantageously, in the volumetric metering method, the gas flow is metered by selecting the duration of the volumetric metering step and/or by selecting the repetition frequency of the volumetric metering step.

The duration of the sonic metering step corresponds to the opening duration of the metering valve.

The repetition frequency of the sonic metering step corresponds to the number of sonic metering steps per unit time. It is comprised between 0.1 and 10 hertz for example. In other words, when it is intended to vary the gas flow, it is possible to maintain constant the duration of the sonic metering step and to repeat the sonic metering step at a different frequency. On the contrary, the frequency may be maintained constant and the duration of the sonic metering step may be modified. It is further possible to change one and the other.

For example, for a repetition frequency of 1 hertz, i.e. one injection per second, the duration of the sonic metering step is typically comprised between 100 milliseconds and 900 milliseconds.

For the volumetric metering, the gas flow is typically metered by adjusting the repetition frequency of the volumetric metering step. Indeed, during the volumetric metering step, the gas pressure is lowered from an initial pressure corresponding to the pressure provided by the supply device down to a minimum pressure depending on the pressure at the release unit. The chamber is thus practically completely emptied. The only possibility for increasing the flow rate is to increase the repetition frequency of this metering step. This frequency is typically comprised between 0.1 hertz and 10 hertz and typically has the value of 1 hertz.

In order to increase this frequency, the waiting step is shortened and vice versa.

It is possible to obtain particularly low flow rates by carrying out partial emptying of the chamber. In this case, either several volumetric metering steps are carried out between two filling steps, each volumetric metering step gradually bringing the pressure in the chamber to a lower value. Alternatively, each volumetric metering step is followed by a filling step, but the chamber is only partly emptied during the volumetric metering step. At the end of the volumetric metering step, the pressure is at an intermediate level between the initial pressure and the minimum pressure.

Advantageously, there exists an overlapping area between the gas flow rate range in which is applied sonic metering, and the gas flow range in which is applied volumetric metering.

With this, it is possible to better control the transition from one metering mode to the other. Notably, in order not to cause any instability, it is preferable to provide hysteresis for passing from one metering mode to the other. If the supply assembly operates in the volumetric mode, it will switch to the sonic mode when the set flow rate value will exceed the first predetermined limit. Conversely, if the supply assembly is in sonic mode, it will only return to the volumetric mode if the set flow rate value drops below the second predetermined limit.

Advantageously, the sonic metering method comprises a learning step including the following sub-steps:

controlling the opening of the metering valve for a predetermined controlled duration;

acquiring a parameter representative of an actual duration of the passing of the gas through the metering valve; and evaluating a corrective factor depending on the control duration and on the actual passing duration, and using the corrective factor for calculating a duration of the sonic metering step according to the set gas flow rate value.

Indeed, as indicated above, in the sonic metering method, the gas flow is metered by notably selecting the duration of the opening of the metering valve. Thus, the accuracy of the mass injected at each injection, and therefore the accuracy of the gas flow rate, directly depends on the accuracy in the opening duration of the metering valve. This opening duration may vary from one valve to another, for a same type of valve. Indeed, some dispersion of the production within a same batch of valves is observed. Moreover, during the lifetime of the valve, a drift occurs over time. Thus, for a same opening control signal, two different valves may deliver different amounts of gas, and a same valve may deliver a different amount of gas when it is new and after use. In order to solve this difficulty, the invention provides the learning step described above. This step is carried out on the production line of the supply assembly, i.e. before its mounting on the vehicle. Alternatively, this step is carried out after mounting the supply assembly on the vehicle, periodically.

The parameter representative of the actual duration of the passing of gas is acquired for example by a pressure probe measuring the pressure in the chamber. This pressure decreases as soon as the metering valve is opened. Alternatively, it is possible to directly measure the actual duration of the passing of the gas by a flow rate probe, notably when the learning step is carried out on a bench of the production line.

The corrective factor is, for example, the difference between the control duration and the actual passing duration. The duration of the sonic metering step provided by the computer is corrected by this factor. For example, the computer determines a theoretical duration depending on the set gas flow rate value and adds the corrective factor to it.

According to a third aspect, the invention is directed to a vehicle exhaust line, equipped with a supply device having these features above.

These and other features may be best understood from the following drawings and specification.

BRIEF DESCRIPTION OF THE DRAWINGS

Other features and advantages of the invention will become apparent from a detailed description which is given thereof below, as an indication and by no means as a limitation, with reference to the appended figures, wherein.

DETAILED DESCRIPTION

Figure 1:
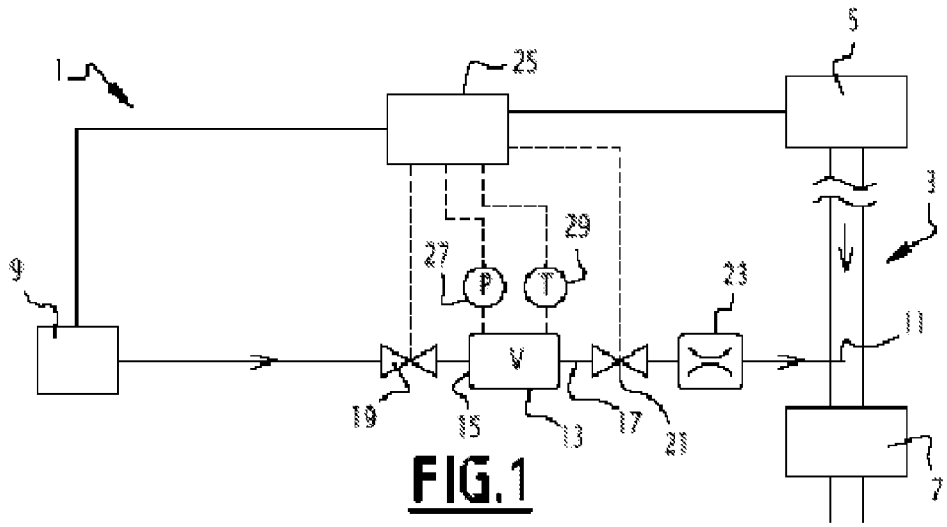
FIG. 1 is a simplified schematic illustration of an assembly for providing a proportioned gas flow according to the invention, provided for supplying ammonia to an exhaust line.

The assembly 1 illustrated in FIG. 1 is intended to provide a proportioned ammonia flow to a vehicle exhaust line 3. The vehicle is typically a car or a truck. The exhaust line 3 captures the exhaust gases at the outlet of the combustion chambers of a heat engine 5.

The exhaust gases contain NOx. In order to limit the releases of NOx into the atmosphere, the exhaust line 3 is equipped with an SCR (Selective Catalytic Reduction) catalyst 7. The assembly 1 injects ammonia gas upstream from the SCR catalyst 7. The ammonia $NH_3$ reacts with the NOx on the catalyst 7, so as to form inert nitrogen $N_2$ and water $H_2O$.

The assembly 1 comprises:
 a device 9 for providing a pressurized ammonia flow;
 a release unit 11 for releasing a proportioned ammonia flow in the exhaust line 3;
 a chamber 13, having an inlet 15 fluidically connected to the device 9 providing ammonia and an outlet 17 fluidically connected to the release unit 11;
 an admission valve 19, inserted between the inlet 15 of the chamber 13 and the device 9 for providing ammonia;
 a metering valve 21, inserted between the outlet 17 of the chamber 13 and the release unit 11;
 a calibrated orifice 23, inserted between the outlet 17 of the chamber 13 and the release unit 11;
 a computer 25, programmed for controlling the admission valve 19 and the metering valve 21 so as to provide a proportioned gas flow to the release unit 11.

The assembly 1 further comprises a pressure sensor 27 measuring the current pressure in the chamber 13, and a temperature sensor 29 measuring the current temperature in the chamber 13. The sensors 27 and 29 inform the computer 25.

The valves 19 and 21 are ON/OFF solenoid valves.

The chamber 13 has an internal volume comprised between 1 and 10 $cm^3$, here having the value of 3 $cm^3$.

The calibrated orifice 23 has a diameter comprised between 0.1 and 1 millimeter, preferably comprised between 0.4 and 0.7 millimeters and here having the value of 0.65 millimeters. The calibrated orifice 23 is inserted between the metering valve 21 and the release unit 11. Alternatively, the calibrated orifice 23 may be inserted between the outlet 17 of the chamber 13 and the metering valve 21, or be formed in the passage section of the metering valve 21 itself.

The assembly 1 is dimensioned to provide the exhaust line 3 with a flow rate comprised between 2 and 120 milligrams per second of ammonia.

The device 9 for providing ammonia is of the type described in EP 2 316 558. The device 9 comprises a main tank and a secondary tank, loaded with a metal salt, for example $MgCl_2$. $MgCl_2$ at room temperature absorbs ammonia gas. This device includes a heating unit, not shown, controlled by the computer 25. The heating unit is laid out for heating the metal salts to cause desorption of the ammonia gas, the latter then being channelled as far as the valve 19. The device 9 provides an ammonia pressure comprised between 2.5 and 5 bars. The ammonia is at a temperature comprised between $-30°$ C. and $+85°$ C.

Figure 2:
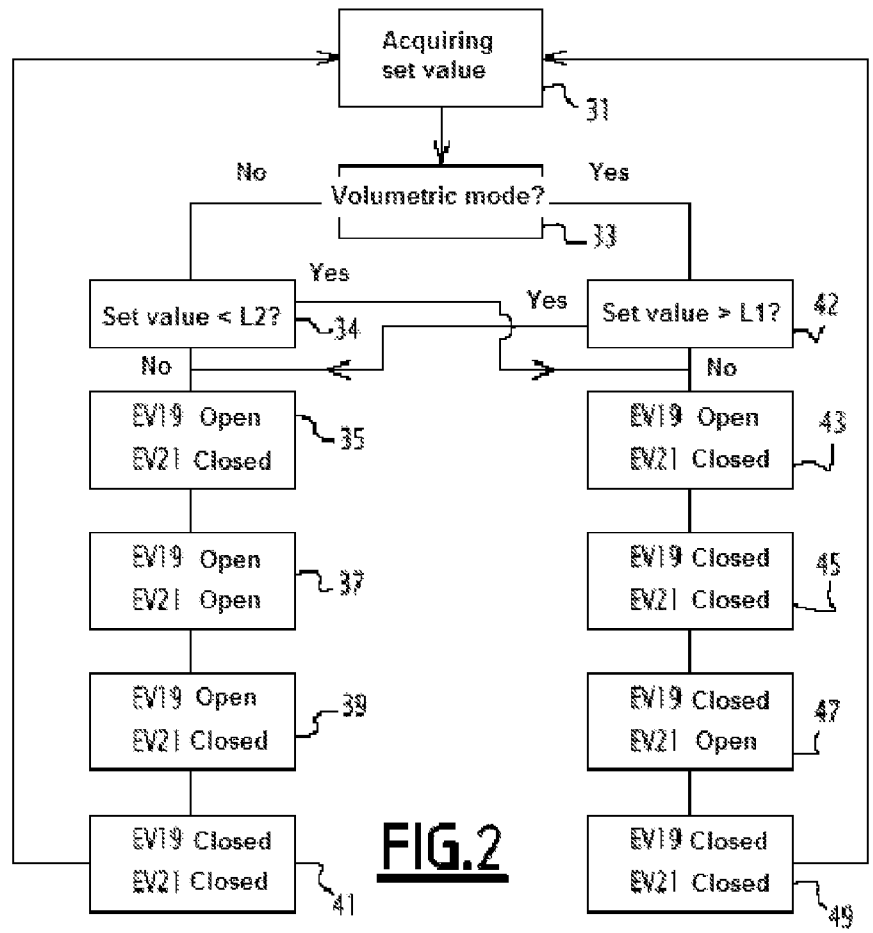
FIG. 2 is a flowchart illustrating the method of the invention.

The computer 25 is programmed for controlling the admission valve 19 and the metering valve 21 according to the flowchart illustrated in FIG. 2. This flowchart is applied iteratively by the computer 25.

Figure 3:
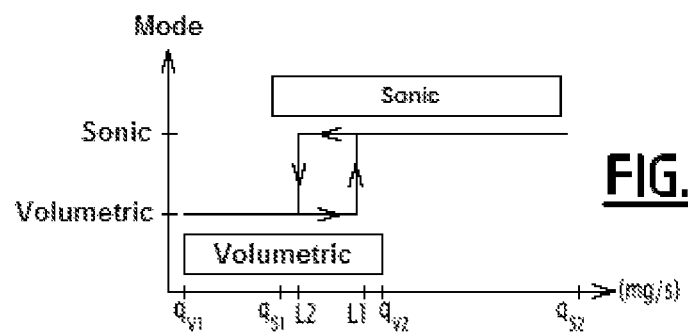
FIG. 3 shows the ranges of uses of the volumetric metering mode and of the sonic metering mode, depending on the set flow rate value.

As illustrated in FIG. 3, the supply assembly is provided for operating according to two different modes: a sonic metering mode and a volumetric metering mode. The sonic metering mode allows ammonia to be metered with accuracy over a mass flow rate range from $q_{s1}$ to $q_{s2}$. The volumetric mode allows ammonia to be metered with accuracy for a mass flow rate range from $q_{v1}$ to $q_{v2}$. Both ranges overlap between $q_{s1}$ to $q_{v2}$.

$q_{v2}$, for a chamber with a determined volume which is entirely emptied at each volumetric metering step, is determined by the maximum repetition frequency which may be reached with the supply assembly. This maximum frequency is, for example, 5 hertz, which corresponds to 5 volumetric metering steps per second. This maximum frequency depends in turn on the time required for opening and closing the valves and on the time required for transferring the ammonia from the supply device 9 as far as into the chamber 13, and from the chamber 13 as far as the release unit 11.

$q_{v1}$ corresponds to a minimum repetition fee of the volumetric metering step. This frequency is arbitrary and is, for example, selected to be 0.5 hertz, i.e. a volumetric metering step every two seconds.

For a repetition frequency of the sonic metering step, for example, determined to be 1 hertz, i.e. one sonic metering per second, $q_{s1}$ is defined by a minimum duration for opening the metering valve. This duration corresponds to the time required for establishing stable sonic flow operating conditions. For example, at a repetition frequency of 1 hertz, the minimum opening time is about 100 milliseconds.

$q_{s2}$ is defined by a maximum duration for opening the valve, considering the repetition frequency of the sonic metering step. For a frequency of 1 hertz, the duration is selected to be 900 milliseconds, for example. This duration is arbitrary.

Figure 5:
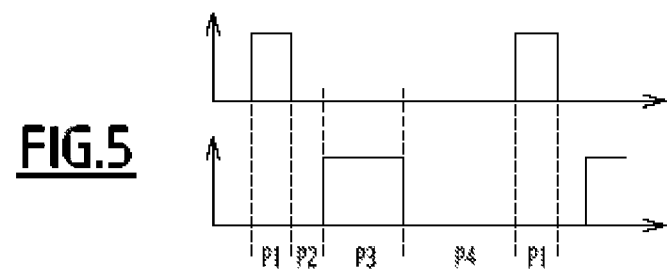
FIG. 5 is a view similar to the one of FIG. 4, for the volumetric metering mode.

Preferably, the overlapping area, i.e. $q_{s1}$–$q_{v2}$, is selected so that it is neither too small nor too large, regardless of the temperature and pressure conditions of the gas provided by the supply device 9. This gives the possibility of properly controlling the passing from one metering mode to another, as illustrated in FIG. 5. Typically, the overlapping range should be at least 5% which may be expressed by the following mathematical relationship:

$$(q_{v2}-q_{S1})/(q_{v2}-q_{v1}) > 5\%$$

As illustrated in FIG. 3, in order not to cause instability, the computer 25 is programmed to obtain hysteresis between both control modes. Thus, if the supply assembly was operating in the previous iteration in the volumetric mode, it will switch to the sonic mode if the set flow rate value exceeds a second predetermined limit L1 slightly less than $q_{v2}$. Symmetrically, if the supply assembly was operating in the sonic mode at the preceding iteration, it will switch into the volumetric mode if the set flow rate value is less than a second limit L2, comprised between $q_{s1}$ and L1.

In an exemplary embodiment, $q_{s1}$ has the value of 16 mg per second, $q_{v2}$ 20 mg per second, L2 is 17 mg per second, and L1 is 19 mg per second.

If one refers to the flowchart of FIG. 2, in step 31, the computer acquires a set flow rate value of ammonia to be injected into the exhaust line 3. This set value is, for example, determined by the computer 25, according to the current operating parameters of the engine. The computer 25 recovers these parameters in the engine computer.

In step 33, the computer tests whether the supply assembly was operating in the volumetric mode or sonic mode at the preceding iteration.

Figure 4:
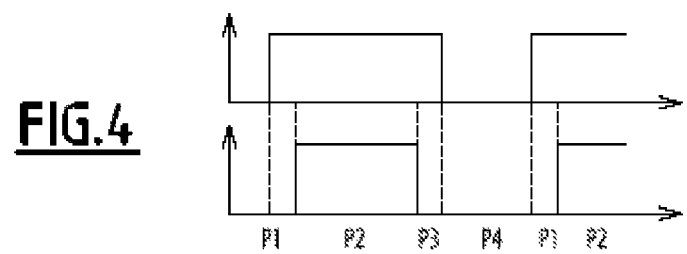
FIG. 4 is a time diagram illustrating the periods of opening and closing the valves of the assembly of FIG. 1, for the sonic metering mode.

If the assembly was operating in sonic mode, the computer switches to step 34. It determines in step 34 whether the set flow rate value is less than the second limit L2. If yes, it directly switches to step 43. Otherwise it goes to step 35. The steps 35 to 41 are illustrated in FIG. 4. They correspond to the sonic metering mode. In step 35, the computer orders the admission valve 19 to open and maintains the metering valve 21 closed (phase P1 of FIG. 4). The ammonia provided by the device 9 therefore feeds the chamber 13. The pressure in this chamber increases.

After a predetermined time, the computer switches to the sonic metering steps 37 (phase P2 of FIG. 4). It orders opening of the metering valve 21 while maintaining the admission valve 19 open. The ammonia provided by the device 9 then flows through the valve 19, the chamber 13 and the valve 21, and then through the calibrated orifice 23 as far as the release unit 11.

The mass flow rate of ammonia in the sonic mode is expressed by the following mathematical relationship:

$$Q\text{sonic} = S\text{col} \times P \times Cd \times Cg \times r / \sqrt{T}$$

wherein:
Scol is the passage section of the calibrated orifice
P and T are the pressure and temperature upstream from the calibrated orifice;
Cd and Cg are constants, related to the geometry of the calibrated orifice and to the thermodynamic properties of the gas; and
r is the cyclic ratio, i.e., the opening duration of the metering valve divided by the cycle time. The cycle time is the reciprocal of the repetition frequency of the sonic metering step.

The opening duration of the metering valve 21 is set by the computer 25 according to the set flow rate value. It corresponds to the duration of the phase P2 illustrated in FIG. 4. Once said duration has elapsed, the computer 25 switches to step 39, during which the admission valve 19 is opened and the metering valve 21 is closed (phase P3 of FIG. 4). It then switches to step 41 (phase P4 of FIG. 4) and orders closing of the admission valve 19 while maintaining the metering valve 21 closed. The computer 25 then returns to step 31.

If in step 33, the computer 25 determines that, at the preceding iteration, the supply assembly was operating in volumetric mode, it switches to step 42.

In this step, it compares the set flow rate value with the first limit L1. If the set value is greater than the limit L1, it then directly switches to step 35 and switches to the sonic mode. On the contrary, if the set flow rate value is less than the first limit L1, it switches to step 43.

Steps 43 to 49 correspond to the volumetric metering mode, illustrated in FIG. 5. In step 43, the computer 25 orders the opening of the admission valve 19 and maintains the metering valve 21 closed (phase P1 of FIG. 5). The ammonia from the supply device 9 then penetrates into the chamber 13, the pressure in the chamber increasing. The duration of the phase P1 corresponds to the time required for opening the admission valve 19, and for putting the chamber 13 into pressure equilibrium with the supply device 9. The computer then switches to the intermediate step 45 (phase P2 of FIG. 15) and orders the closing of the admission valve 19, the metering valve 21 remaining closed. The computer 25 then switches to the volumetric metering phase 4 (phase P3 of FIG. 5). It orders the opening of the metering valve 21, while maintaining the admission valve 19 closed. The duration of the volumetric metering step is predetermined. During this step, the pressure in the chamber 13 decreases, down to a minimum pressure and depending on the pressure in the exhaust line 3. This pressure is, for example, equal to the pressure of the exhaust line or is slightly greater than this pressure. For example, it has a value of 1 bar.

Once the predetermined duration of the volumetric metering step has elapsed, the computer switches to the waiting step 49 (phase P4 of FIG. 5), it orders the closing of the metering valve 21, and maintains the admission valve 19 closed. It then returns to step 31.

The mass flow rate of ammonia in the volumetric mode may be calculated according to the following mathematical relationship:

$$Q\text{volumetric} = \Delta P \times V \times M \times f / RT$$

wherein

ΔP is the pressure difference in the chamber 13 between the beginning and the end of the volumetric metering step, as measured by the sensor 27;

V is the volume of the chamber 13;

M is the molar mass of the ammonia;

f is the repetition frequency of the volumetric metering step, expressed in hertz;

R is the ideal gas constant; and

T is the temperature of the gas in the chamber 13, measured by the sensor 29.

The computer selects the frequency f so as to obtain a volume flow rate equal to said value.

The method described above gives the possibility of covering the whole sought flow rate range, i.e. at least from 2 to 120 mg/s, for all the pressure/temperature pairs in the pressure range from 2.5 to 5 bars, and in the temperature range from −30° C. to 85° C. The pressure here is the pressure of the gas delivered by the supply device 9.

Figure 6:
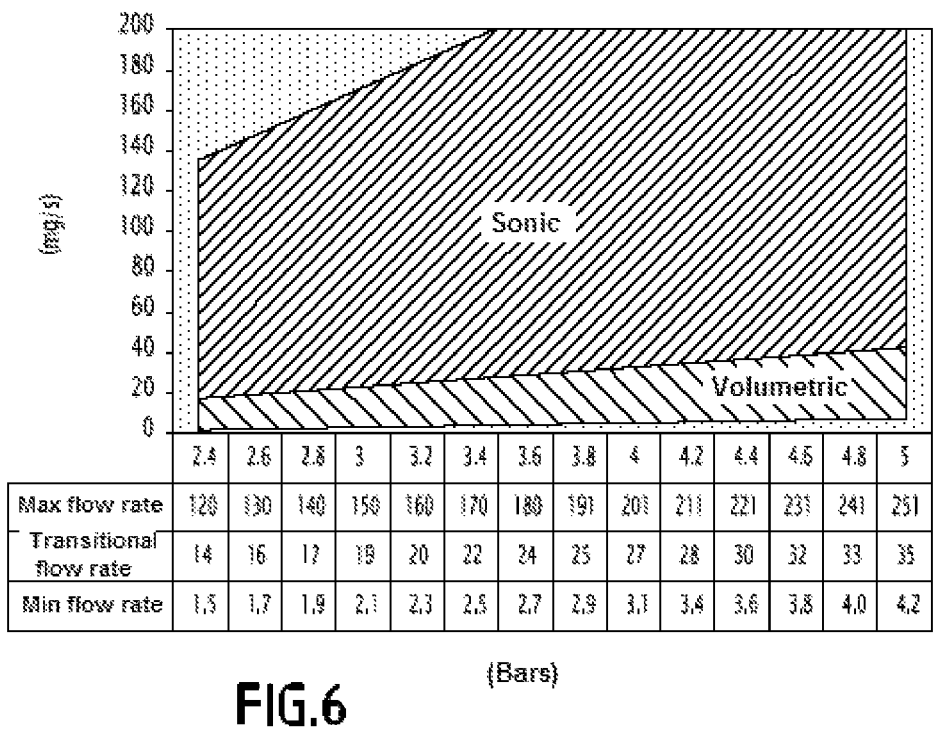
FIG. 6 illustrates the fields of use of the volumetric metering mode and of the sonic metering mode, depending on the set flow rate value and on the pressure provided by the gas supply device.

FIG. 6 illustrates the mass flow rate ranges of ammonia which may be obtained in the volumetric mode and in the sonic mode, at 20° C., for a pressure of the gas delivered by the supply device 9, varying between 2.4 and 5 bars. The table appearing under the figure contains three lines, the lower line corresponding to the minimum flow rate which may be obtained with the assembly and method of the invention, the line immediately above to the flow rate at which the volumetric mode is switched to the sonic mode, and the third line from the bottom to the maximum flow rate which may be obtained with the assembly and method of the invention. In the figure, the lower area, marked as "volumetric" corresponds to the area where the assembly operates in the volumetric mode. The upper area, indicated as "sonic", corresponds to the area where the assembly operates in the sonic mode.

Figure 7:
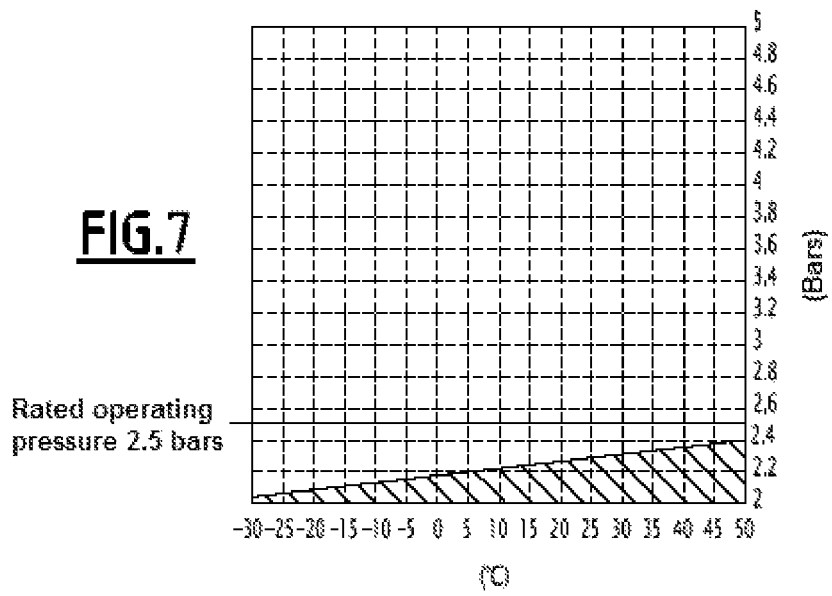
FIG. 7 is a graph indicating whether the extent of the overlapping between the volumetric metering range and the sonic metering range is greater than 5%, versus the pressure provided by the supply device and the gas temperature.

FIG. 7 shows that it is possible to obtain overlapping of the operating ranges of the sonic mode and of the volumetric mode by at least 5%, regardless of the pressure delivered by the device 9 between 2.5 and 5 bars, and regardless of the temperature of the gas between −30° C. and 50° C. The lower area of FIG. 7 corresponds to the area where it is not possible to obtain 5% overlapping of both ranges. The upper area corresponds to the area where it is possible to obtain overlapping by at least 5%.

Figure 8:
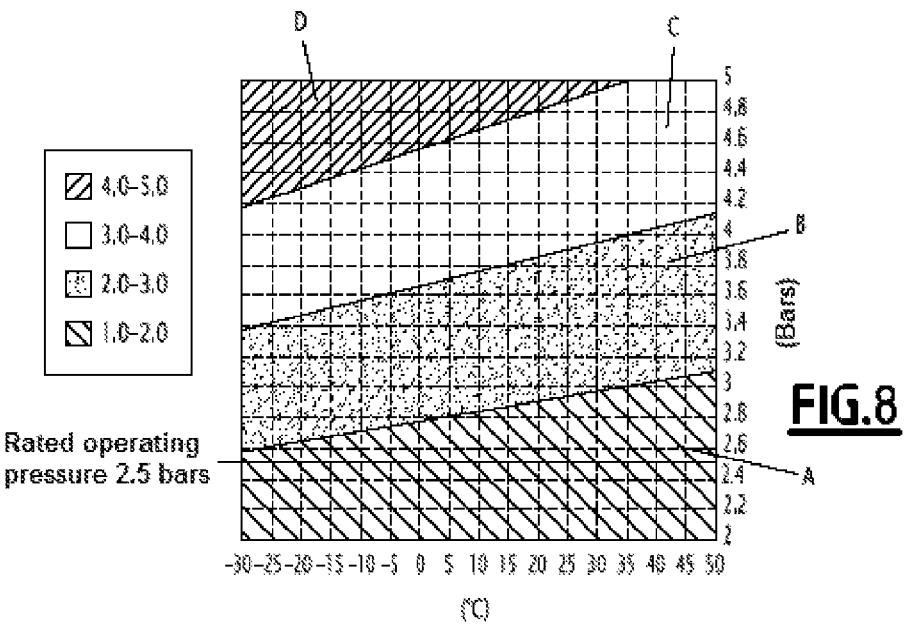
FIG. 8 indicates the minimum reachable mass flow rates for volumetric metering, versus the pressure provided by the supply device and the temperature of the gas.

In FIG. 8, the minimum flow rates are illustrated which may be obtained in the volumetric mode, depending on the pressure delivered by the device 9 and on the temperature of the gas. The area marked A corresponds to a minimum flow rate comprised between 1 and 2 mg/s of gas. The areas marked B, C, and D respectively correspond to minimum flow rates comprised between 2 and 3 mg/s, 3 and 4 mg/s, and 4 and 5 mg/s. Thus it is seen that for all the pressures above 2.5 bars, regardless of the temperature, it is possible to obtain a minimum flow rate of less than 2 mg/s.

Figure 9:
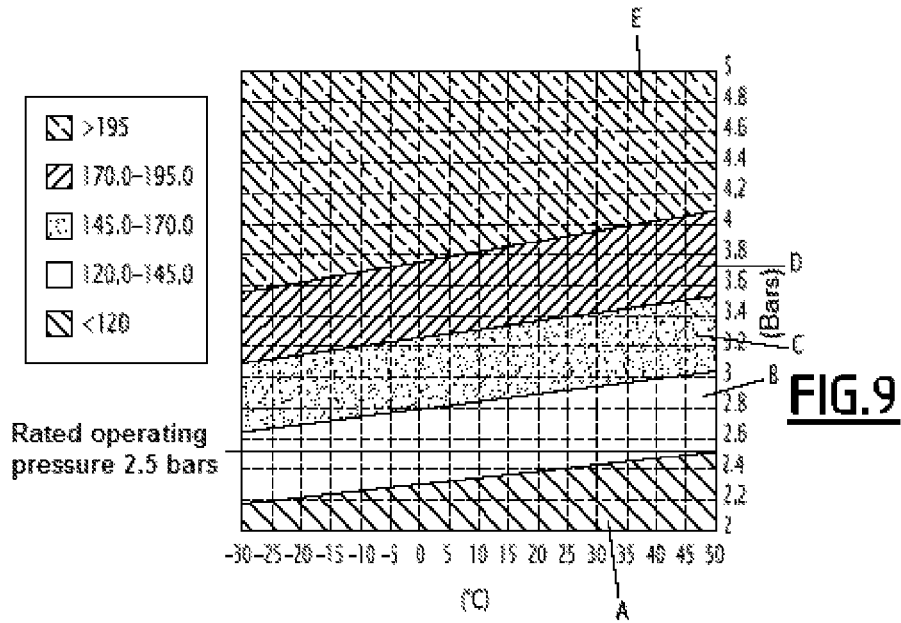
FIG. 9 is a view similar to one of FIG. 8 indicating the maximum reachable mass flow rate for sonic metering.

In FIG. 9, a maximum mass flow rate is illustrated which may be obtained with the assembly and method of the invention, depending on the gas temperature and on the pressure delivered by the device 9 in the sonic mode. The area marked A corresponds to a mass flow rate of less than 120 mg/s. The areas B, C, D, and E respectively correspond to maximum mass flow rates comprised between 120 and 145 mg/s, between 145 and 170 mg/s, between 170 and 195 mg/s, and greater than 195 mg/s. It is clearly seen in FIG. 9 that for all the pressures above 2.5 bars, independently of temperature, the maximum mass flow rate is greater than 120 mg/s.

Figure 10:
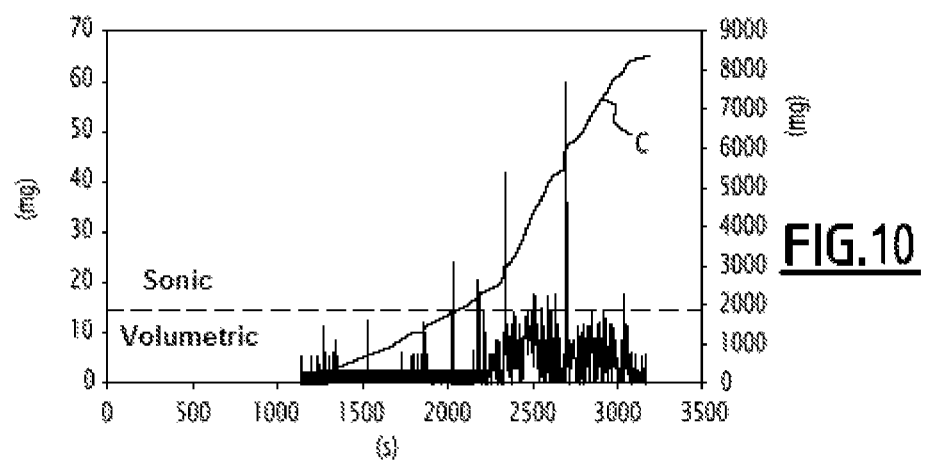
FIG. 10 illustrates for a typical operating cycle of a vehicle, the different injections carried out over time, as well as the cumulated injected ammonia mass.

FIG. 10 illustrates the ammonia injections (expressed in mg, scale on the left) for a vehicle equipped with an assembly according to the invention for a typical life cycle, known as ARTEMIS. The abscissas are graduated in seconds. The interrupted transverse line corresponds to the transition level between the volumetric metering (below the line) and the sonic metering (above the line). The curve C corresponds to the accumulation of the injected masses (expressed in mg, scale on the right). It is seen that the maximum injection attains 60 mg. Only 1% of the injections are carried out in the sonic mode. The other injections are carried out in the volumetric mode, i.e. about 2400 injections.

Figure 11:
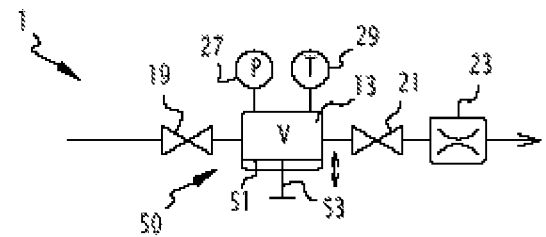
FIG. 11 is a schematic illustration of an alternative of the supply assembly of the device, wherein the chamber is equipped with a taring device.

FIG. 11 illustrates an embodiment of the invention. Only the points by which this alternative differs from the embodiment of FIG. 1, will be detailed below. Identical elements ensuring the same function will be designated with the same references as in the embodiment of FIG. 1.

The chamber 13 includes a taring device 50, with a mobile wall 51, which may be displaced via a taring unit 53. The displacement of the wall 51 relatively to the other walls of the chamber gives the possibility of adjusting the internal volume of the chamber 13 occupied by the exhaust gases. The unit 53 is, for example, a piston or a screw.

The internal volume of the chamber 13 is tared at the end of the manufacturing cycle of the supply assembly 1. The supply assembly is set into operation in the volumetric mode, under predetermined conditions (gas pressure provided by the supply device 9, gas temperature, cycle for opening and closing the admission valve and the metering valve, repetition frequency of the volumetric metering step). Under these conditions, the supply assembly is intended for providing a predetermined mass flow rate of ammonia. The actual flow rate provided by the assembly 1 under such conditions is measured and compared with the expected theoretical flow rate. The volume of the chamber 13 is tared to set the actual flow rate to the theoretical flow rate.

Figure 12:
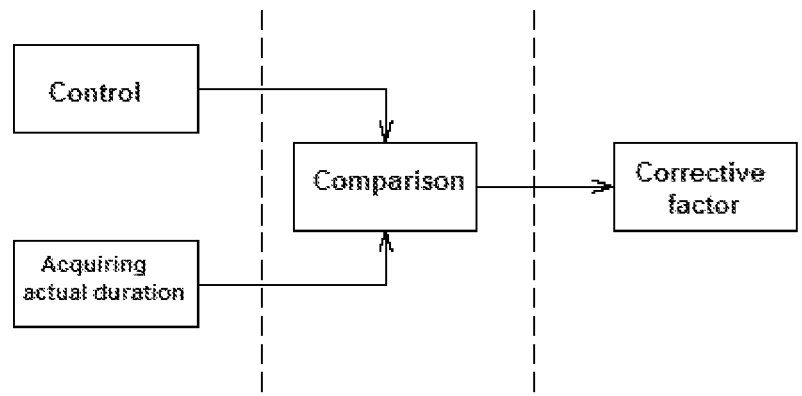
FIG. 12 schematically illustrates the sub-steps of the learning step.

The method of the invention alternatively comprises a learning step illustrated in FIG. 12. This learning step is carried out:
  either at the end of the manufacturing cycle of the supply assembly, before mounting the supply assembly on-board a vehicle; or
  after mounting the supply assembly on-board the vehicle, periodically, for resetting the operation of the supply assembly.

It was noticed that, for a signal for ordering the opening of the metering valve with a determined duration, the actual duration for opening the valve may vary from one valve to another, depending on dispersion in the production. Moreover, for a same valve, a control signal of a determined duration may entail an opening duration which varies depending on whether the valve is new or worn.

The learning step aims at ensuring that the actual opening duration of the metering valve is as close as possible to the duration of the control signal. This gives the possibility of increasing the accuracy of the metering in the sonic mode.

As illustrated in FIG. 12, the learning step comprises the following sub-steps:
  ordering the opening of the metering valve 21 for a predetermined control duration;
  concomitantly acquiring a parameter representative of the actual duration of the passing of the gas through the metering valve;

comparing the predetermined control duration with the actual duration; and evaluating a corrective factor depending on the control duration and on the actual passing duration.

The parameter representative of the actual duration of the passing of the gas is typically the pressure in the chamber 13. This pressure is lower when the metering valve 21 is open. By tracking the changes in the pressure measured by the sensor 27, it is therefore possible to determine the actual duration of the passing of the gas through the metering valve 21, i.e. the actual duration of the opening of the metering valve 21. The corrective factor is equal to the control duration minus the actual duration.

This corrective factor is stored in memory by the computer 25. In the sonic mode, the computer 25 will determine a theoretical duration Ttheo of the opening of the metering valves 21 depending on said flow rate value and will calculate the duration Tcom of the opening control signal applied to the metering valve 21 by using the following equation:

$$Tcom = Ttheo + \text{corrective factor}$$

Figure 13:
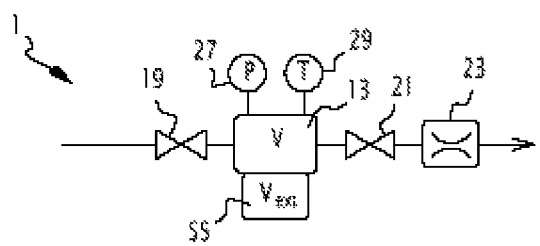
FIG. 13 is a view similar to that of FIG. 11, for another alternative embodiment of the invention, wherein the supply assembly is equipped with an additional chamber.

FIG. 13 illustrates a second alternative embodiment of the invention. Only the points by which this alternative embodiment differs from the embodiment of FIG. 1 will be detailed below. The identical elements or ensuring the same function as in the embodiment of FIG. 1 will be designated with the same references.

In this alternative embodiment, the chamber 13 is adapted in order to be selectively mounted:
either alone in the supply assembly 1; or
together with an additional chamber 55.

FIG. 13 shows the chamber 13 mounted together with the additional chamber 55.

The chamber 13 typically includes a wall which may be disassembled. When the chamber 13 is mounted alone, the wall which may be disassembled is in place. When the chamber 13 is bound together with the additional chamber 55, the wall which may be disassembled is disassembled, and the additional chamber 55 is mounted instead of the wall which may be disassembled. In this case, the chamber 13 and the additional chamber 55 are laid out so that their respective internal volumes communicate. The mass flow rate which may be obtained in the volumetric mode by the supply assembly is thus increased.

It is thus possible to adapt this flow rate depending on the engine type of the vehicle. A vehicle having a more powerful engine will be equipped both with the chamber 13 and the additional chamber 55. A vehicle having a less powerful engine type will be only equipped with the chamber 13.

It is possible to have several additional chambers with internal volumes different from each other. It is thus possible to select the volume of the additional chamber depending on the power of the engine type of the vehicle.

The additional chamber 55 is typically attached onto the chamber 13.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An assembly to provide a proportioned gas flow, the assembly comprising:
a device that provides a pressurized flow of gas;
a release unit that releases the proportioned gas flow;
a chamber having an inlet fluidically connected to the device and an outlet fluidically connected to the release unit;
an admission valve inserted between the inlet of the chamber and the device;
a metering valve inserted between the outlet of the chamber and the release unit;
a computer programmed to control the admission valve and the metering valve so as to provide a proportioned gas flow to the release unit;
a calibrated orifice inserted between the outlet of the chamber and the release unit; and
wherein the computer is programmed to control the admission valve and the metering valve according to a set gas flow rate value:
wherein for a set flow rate value greater than a first predetermined limit, the computer is programmed to apply at least one sonic metering step wherein the admission valve and the metering valve are open for a determined period simultaneously, at a determined frequency;
wherein for a set flow rate value less than a second predetermined limit, the computer is programmed to apply at a determined frequency, at least:
a step for filling the chamber, wherein the admission valve is open and the metering valve is closed; and
a volumetric metering step, wherein the admission valve is closed and the metering valve is open for a determined period.

2. The assembly as set forth in claim 1, wherein the calibrated orifice is interposed between the metering valve and the release unit, or between the outlet of the chamber and the metering valve, or is formed in a passage section of the metering valve.

3. The assembly as set forth in claim 1, wherein the assembly comprises a unit that acquires current pressure in the chamber and informs the computer.

4. The assembly as set forth in claim 1, wherein the assembly comprises a unit that acquires current temperature in the chamber and informs the computer.

5. The assembly as set forth in claim 1, wherein the chamber comprises a taring device suitable for taring an internal volume of the chamber.

6. The assembly as set forth in claim 1, wherein the assembly comprises an additional chamber, the chamber being suitable for being selectively mounted alone in the assembly, or for being mounted together with the additional chamber in the assembly, the chamber and the additional chamber then having respective internal volumes fluidically communicating with each other.

7. An assembly to provide a proportioned gas flow, the assembly comprising:
a device that provides a pressurized flow of gas;
a release unit that releases the proportioned gas flow;
a chamber having an inlet fluidically connected to the device and an outlet fluidically connected to the release unit;
an admission valve inserted between the inlet of the chamber and the device;
a metering valve inserted between the outlet of the chamber and the release unit;
a computer programmed to control the admission valve and the metering valve so as to provide a proportioned gas flow to the release unit;
a calibrated orifice inserted between the outlet of the chamber and the release unit; and wherein the computer is programmed to apply a method for controlling the assembly comprising the following steps:

acquiring a set gas flow rate value;

comparing the set gas flow rate value with first and second predetermined limits;

if the set flow rate value is greater than the first predetermined limit, applying a sonic metering method, comprising at least one sonic metering step wherein the admission valve and the metering valve are open for a determined period simultaneously, at a determined frequency;

if the set flow rate value is less than a second predetermined limit, applying a volume of metering method, comprising at least the following steps performed at a determined frequency:

a step for filling the chamber, wherein the admission valve is open and the metering valve is closed; and a volumetric metering step, wherein the admission valve is closed and the metering valve is open for a determined period.

8. A method for controlling a supply assembly to provide a proportioned gas flow, the supply assembly comprising a device that provides a pressurized flow of gas, a release unit that releases the proportioned gas flow, a chamber having an inlet fluidically connected to the device and an outlet fluidically connected to the release unit, an admission valve inserted between the inlet of the chamber and the device, a metering valve inserted between the outlet of the chamber and the release unit, a computer programmed to control the admission valve and the metering valve so as to provide a proportioned gas flow to the release unit, and a calibrated orifice inserted between the outlet of the chamber and the release unit, the method including the following steps:

acquiring a set gas flow rate value;

comparing the set gas flow rate value with first and second predetermined limits;

if the set flow rate value is greater than the first predetermined limit, applying a sonic metering method, comprising at least one sonic metering step wherein the admission valve and the metering valve are open for a determined period simultaneously, at a determined frequency;

if the set flow rate value is less than a second predetermined limit, applying a volume of metering method, comprising at least the following steps performed at a determined frequency:

a step for filling the chamber, wherein the admission valve is open and the metering valve is closed; and a volumetric metering step, wherein the admission valve is closed and the metering valve is open for a determined period.

9. The method as set forth in claim 8, wherein the sonic metering method successively comprises:

an opening step, wherein the admission valve is opened and the metering valve is closed;

the sonic metering step;

a closing step, wherein the admission valve is open and the metering valve is closed; and a waiting step, wherein the admission valve is closed and the metering valve is closed.

10. The method as set forth in claim 8, wherein the volume of metering method successively comprises:

the filling step;

an intermediate step, wherein the admission valve is closed and the metering valve is closed;

the volumetric metering step; and a waiting step, wherein the admission valve is closed and the metering valve is closed.

11. The method as set forth in claim 8, wherein, in the sonic metering method, the gas flow is metered by selecting a duration of the sonic metering step and/or by selecting a repetition frequency of the sonic metering step.

12. The method as set forth in claim 8, wherein, in the volumetric metering method, gas flow is metered by selecting a duration of the volumetric metering step and/or by selecting a repetition frequency of the volumetric metering step.

13. The method as set forth in claim 8, wherein the sonic metering method is intended to provide a first range of gas mass flow rates, the volumetric metering method being intended to provide a second range of mass flow rates, the first and second ranges exhibiting an at least 5% overlap of the second range.

14. The method as set forth in claim 8, wherein the volumetric metering method comprises several volumetric metering steps between the two filling steps, the chamber only being partly emptied at least in the first volumetric metering step.

15. The method as set forth in claim 8, wherein the method comprises an initial step for taring an internal volume of the chamber.

16. The method as set forth in claim 8, wherein the sonic metering method comprises a learning method including the following sub-steps:

ordering the opening of the metering valve for a predetermined control duration;

acquiring a parameter representative of an actual duration of the passing of the gas through the metering valve; and evaluating a corrective factor depending on the control duration and on the actual passage duration, and using the corrective factor for calculating a duration of the sonic metering step depending on the set gas flow rate value.

17. The assembly as set forth in claim 1, wherein the assembly comprises a supply assembly configured for a vehicle exhaust line that conducts vehicle exhaust gases.

18. The assembly as set forth in claim 7, wherein the assembly comprises a supply assembly configured for a vehicle exhaust line that conducts vehicle exhaust gases.

* * * * *